(12) United States Patent
Gilmore

(10) Patent No.: US 7,753,291 B2
(45) Date of Patent: Jul. 13, 2010

(54) WATER OUTLET APPARATUS

(75) Inventor: Edward John Gilmore, County Down (IE)

(73) Assignee: Munster Simms Engineering Limited, Bangor, County Down (GB)

( * ) Notice: Subject to any disclaimer, the term of this patent is extended or adjusted under 35 U.S.C. 154(b) by 30 days.

(21) Appl. No.: 11/926,461

(22) Filed: Oct. 29, 2007

(65) Prior Publication Data

US 2008/0156888 A1   Jul. 3, 2008

(30) Foreign Application Priority Data

Oct. 30, 2006   (GB) ................... 0621530.5

(51) Int. Cl.
   *B05B 7/04*   (2006.01)
   *B05B 7/12*   (2006.01)
(52) U.S. Cl. .................. 239/443; 239/444; 239/446; 239/407; 239/414; 137/625.41
(58) Field of Classification Search ............ 239/401, 239/407, 537, 567, 558, 499, 505–514, 443–446, 239/530, 532, 437, 438; 137/625.41
See application file for complete search history.

(56) References Cited

U.S. PATENT DOCUMENTS

| | | | | |
|---|---|---|---|---|
| 633,069 | A * | 9/1899 | Busha ................. | 239/444 |
| 2,776,168 | A * | 1/1957 | Schweda ............... | 239/587.4 |
| 4,652,024 | A * | 3/1987 | Krohn ................. | 285/111 |
| 4,785,998 | A * | 11/1988 | Takagi ................ | 239/440 |
| 4,848,667 | A * | 7/1989 | Dyck .................. | 239/446 |
| 4,989,295 | A * | 2/1991 | Guhne et al. .......... | 15/410 |
| 5,584,594 | A * | 12/1996 | Newville .............. | 401/289 |
| 6,158,469 | A * | 12/2000 | Yen ................... | 137/801 |
| 6,619,570 | B1 * | 9/2003 | Ericksen et al. ....... | 239/532 |
| 6,789,751 | B1 * | 9/2004 | Fan ................... | 239/525 |
| 6,811,100 | B2 * | 11/2004 | Bardinet et al. ....... | 239/532 |
| D583,012 | S * | 12/2008 | McGilloway et al. .... | D23/213 |
| 2005/0284962 | A1* | 12/2005 | Mukai ................ | 239/525 |
| 2008/0313801 | A1* | 12/2008 | Saxon ................ | 4/599 |

* cited by examiner

*Primary Examiner*—Len Tran
*Assistant Examiner*—James S Hogan
(74) *Attorney, Agent, or Firm*—Ronald E. Greigg

(57) ABSTRACT

A water outlet apparatus comprises a hand-held tubular wand in two co-axial rotatable parts in which at or towards the outer end of an outer part water outlet means is provided. A mixing/shut-off valve is housed in an inner end of the outer part. An inner part has secured therein one end of a hosing for delivery separately of two types of water, i.e. hot water and cold water, to the valve for mixing. The other end of the hosing is for integration into two separate sources of water. The water outlet means may be a series of nozzles radially of the outer part of the wand for use as a shower head.

20 Claims, 2 Drawing Sheets

WATER OUTLET APPARATUS

REFERENCE TO FOREIGN PATENT APPLICATION

This application is based on United Kingdom Patent Application No. 0621530.5 filed 30 Oct. 2006, upon which priority is claimed.

BACKGROUND OF THE INVENTION

Field of the Invention

This invention relates to a water outlet apparatus for personal use, primarily but not necessarily, in ablutions.

SUMMARY OF THE INVENTION

The present invention is a water outlet apparatus comprising a hand-held tubular wand in two co-axial rotatable parts in which at or towards the outer end of an outer part water outlet means is provided with a mixing/shut-off valve being housed in an inner end thereof, an inner part having secured therein one end of a hosing for delivery separately of two types of water to the valve for mixing, the other end of the hosing being for integration into two separate sources of water.

Preferably the water outlet means is a series of nozzles of the outer part of the wand for use as a shower head. The nozzles are preferably arranged radially of the outer part of the wand. Alternatively, the water outlets means is a faucet head provided radially of the outer part of the wand.

Preferably also, the hosing is a flexible concentric pipe, a flexible pipe partitioned to form two passages or two flexible side-by-side pipes linked together or located within an outer covering. The mixing/shut-off valve is preferably of a ceramic material.

Preferably further, the wand is of stainless steel or of a plastics material. Each part is beneficially provided with gripping means to enable the parts to be gripped for rotation relative to each other. The gripping means may take different forms, for example the nozzles may protrude out from the outer part of the wand and a number of similar protrusions may be provided on the inner part. Alternatively, the outer surface of the inner part is shaped to provide a grip, or is interfered with to provide checking or knurling for gripping. The inner end of the inner part is desirably tapered in a direction away from the outer part to seat in a ring, or a clip of substantially three quarter circular shape for upward support of the wand.

BRIEF DESCRIPTION OF THE DRAWINGS

Preferred embodiments of the present invention will be described herein below, with reference to the accompanying drawings, in which.

DESCRIPTION OF THE PREFERRED EMBODIMENTS

Figure 1:
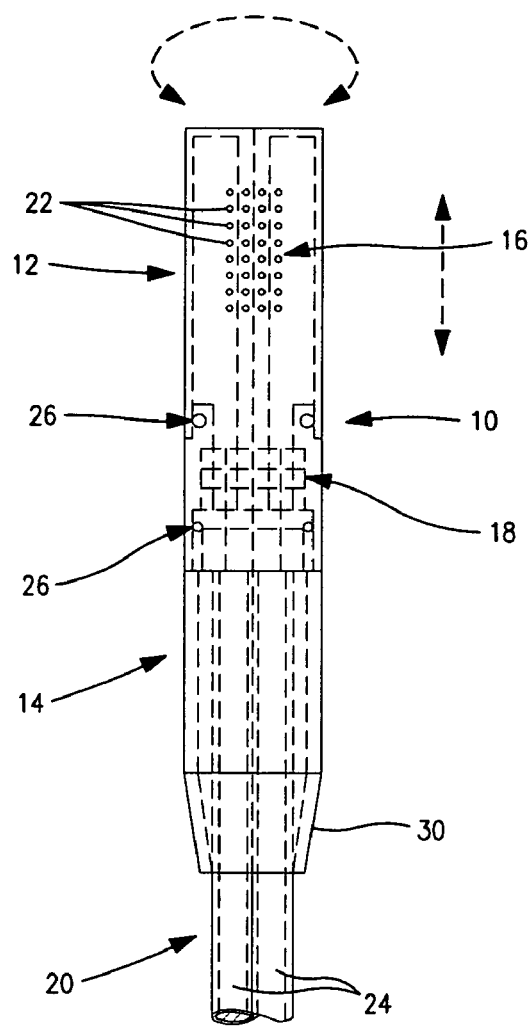
FIG. 1 is a cross-sectional view of a water outlet apparatus according to the present invention showing one form of water outlet means.

Referring to the drawings, a water outlet apparatus comprises a hand-held tubular wand 11 in two co-axial rotatable parts 12, 14 in which at or towards the outer end of the outer part 12, water outlet means 16 is provided with a mixing/shut-off valve 18 being housed in an inner end thereof for rotation relative thereto. The inner part 14 has secured therein one end of a hosing 20 for delivery separately of two types of water, i.e. hot and cold water, to the valve 18 for mixing, the other end of the hosing 20 being for integration into two separate sources of water (not shown). This arrangement provides the hand-held wand 10 with water flow, temperature control and shut off.

In FIG. 1, the water outlet means 16 is shown as a series of nozzles 22 arranged in a rectangular array radially of the outer part of the wand 10 as shown for use as a shower head.

The hosing 20 is two flexible side-by-side pipes or tubes 24 located within an outer covering or are linked together by forming or fusing together. Alternatively, the hosing 20 is a flexible concentric pipe (not shown) or a flexible pipe partitioned to form two passages (not shown). The mixing/shut-off valve 18 is desirably of a ceramic material but may be of a plastics material. There are O-rings 26 between the valve 18 and its seating in the outer part 12 and between it and the inner part 14. Part of the mixing/shut-off valve is made fast with the inner part.

The wand 10 is of stainless steel or of a plastics material. The plastics material may have a metallised outer finish, such as chrome. Each part 12, 14 of the wand 10 is provided with gripping means to enable the parts to be gripped for rotation relative to each other. The gripping means may take different forms, for example the nozzles protrude out from the outer part of the wand and a number of similar protrusions (not shown) are provided on the inner part. Alternatively, the outer surface of the inner part is shaped to provide a grip (not shown), or is interfered with to provide checking or knurling for gripping (not shown) or recesses in which protrusions of rubber may be inserted (not shown). The inner end of the inner part 14 is tapered at 30 in a direction away from the outer part to seat in a ring (not shown), or a clip of substantially three quarter circular shape for support of the wand when in use or out-of-use.

Figure 2:
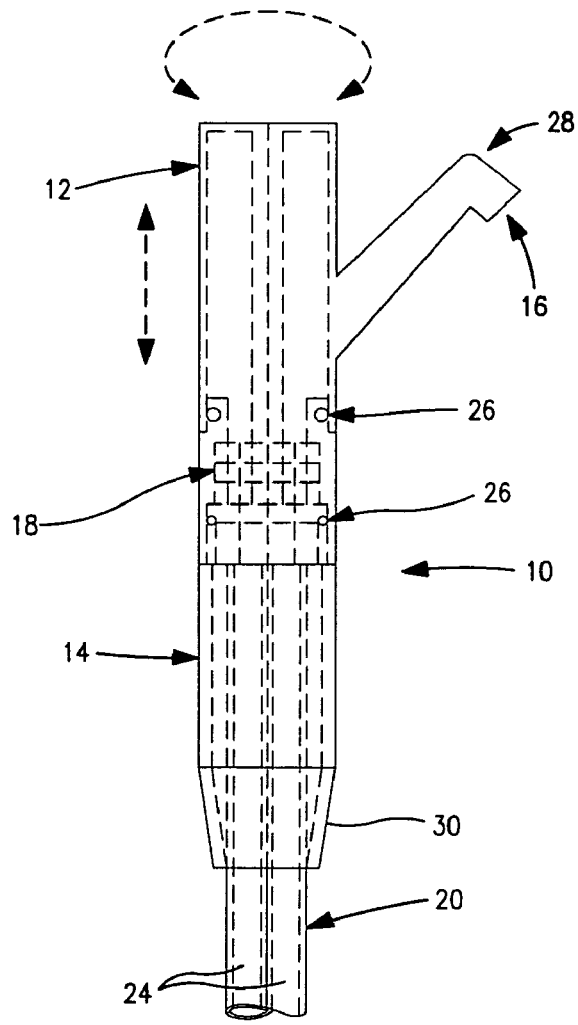
FIG. 2 is a cross-sectional view of the water outlet apparatus showing a second form of water outlet means.

Alternatively in FIG. 2, the water outlet means is shown as a faucet head 28 provided radially of the outer part of the wand 10.

In use, the wand is removed from its support and the parts are rotated relative to each other to cause the two types of waters to flow and be mixed as required to obtain the necessary temperature mix. After use, the parts are rotated relative to each other to shut off the flow of waters and the wand placed back into its support.

In a first modification (not shown), the marginal zone next to the outer end of the outer part of the wand may be fashioned as a rotatable on/off switch having a jet nozzle through the outer end, a facility being provided to close off the passage of water to the series of nozzles or faucet head on opening of the on/off switch.

Figure 3:
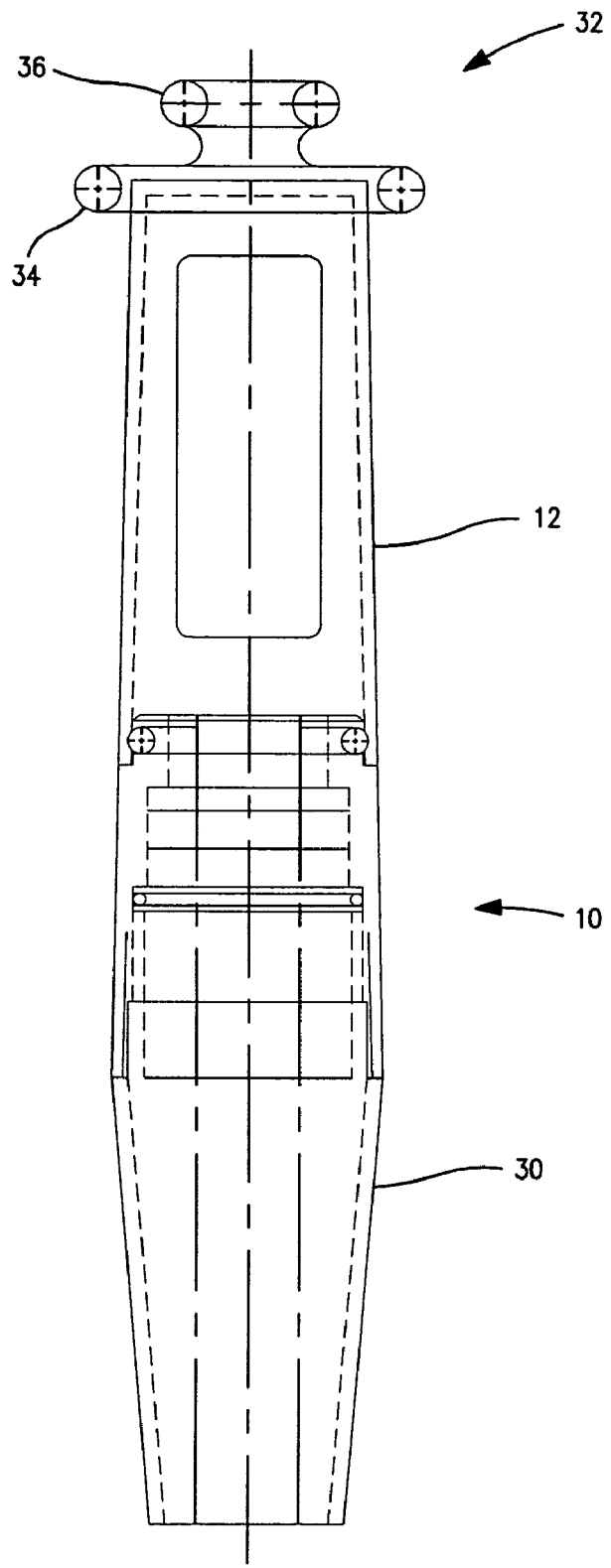
FIG. 3 is a cross-sectional view of the water outlet apparatus according to a second modification.

In a second modification, an end fitment 32 is secured over the outer end of rotatable part 12 as shown in FIG. 3. The end fitment 32 is rubberised to prevent damage to any ground/deck surface if the wand 10 is dropped. The surface may be the deck of a vessel, e.g. motor boat or motor cruiser or other surface below where the apparatus is fitted. The fitment comprises two space circular formations 34, 36 which may be of different diameter as shown, the larger one 34 being attached to the outer end of part 12. The formations 34, 36 are axially secured together. The larger one 34 may also serve to close off the entry to a recessed holder (not shown) for the wand 10.

Variations and other modifications may be made without departing from the scope of the invention described above and as claimed hereinafter.

I claim:

1. A water outlet apparatus comprising
   a hand-held tubular wand embodied in two co-axial rotatable parts, an inner part of the wand being connected to one end of a hosing and an outer part of the wand being provided with water outlet means at or towards an outer end of the outer part, and
   a mixing/shut-off valve being housed in an inner end of the outer part of the wand oriented toward the inner part of the wand, a part of the mixing/shut-off valve made fast with the inner part of the wand, the hosing delivering separately through the inner part, two types of water to the valve for mixing,
   an other end of the hosing being for integration into two separate sources of water, wherein
   the inner part and the outer part are rotatable relative to one another causing the two types of water to flow and be mixed via the valve to obtain a certain temperature of mixed water.

2. A water outlet apparatus according to claim 1, wherein the water outlet means comprises a series of nozzles of the outer part of the wand for use as a shower head.

3. A water outlet apparatus according to claim 2, wherein the nozzles are arranged radially of the outer part of the wand.

4. A water outlet apparatus according to claim 3, wherein the hosing is a flexible concentric pipe, a flexible pipe partitioned to form two passages or two flexible side-by-side pipes linked together or located within an outer covering.

5. A water outlet apparatus according to claim 2, wherein the hosing is a flexible concentric pipe, a flexible pipe partitioned to form two passages or two flexible side-by-side pipes linked together or located within an outer covering.

6. A water outlet apparatus according to claim 2, further comprising an end fitment secured over the outer end of the rotatable part of the wand.

7. A water outlet apparatus according to claim 1, wherein the water outlet means comprises a faucet head provided radially of the outer part of the wand.

8. A water outlet apparatus according to claim 7, wherein the hosing is a flexible concentric pipe, a flexible pipe partitioned to form two passages or two flexible side-by-side pipes linked together or located within an outer covering.

9. A water outlet apparatus according to claim 7, further comprising an end fitment secured over the outer end of the rotatable part of the wand.

10. A water outlet apparatus according to claim 1, wherein the hosing is a flexible concentric pipe, a flexible pipe partitioned to form two passages or two flexible side-by-side pipes linked together or located within an outer covering.

11. A water outlet apparatus according to claim 1, wherein the mixing valve is of a ceramic material.

12. A water outlet apparatus according to claim 11, wherein the wand is of stainless steel or of a plastics material.

13. A water outlet apparatus according to claim 1, wherein the wand is of stainless steel or of a plastics material.

14. A water outlet apparatus according to claim 1, wherein both the outer part and the inner part of the wand are provided with gripping means to enable the parts to be gripped for rotation relative to each other.

15. A water outlet apparatus according to claim 14, wherein the gripping means on the outer part comprises at least one nozzle protruding out from the outer part of the wand an the gripping means on the inner part comprises a number of protrusions provided on the inner part.

16. A water outlet apparatus according to claim 1, wherein the outer surface of the inner part is shaped to provide a grip, or is interfered with to provide checking or knurling for gripping.

17. A water outlet apparatus according to claim 1, wherein the inner end of the inner part is tapered in a direction away from the outer part to provide a seat to be received in a ring or a clip of substantially three quarter circular shape for upward support of the wand.

18. A water outlet apparatus according to claim 1, further comprising an end fitment secured over the outer end of the rotatable part of the wand.

19. A water outlet apparatus according to claim 18, wherein the end fitment is rubberized.

20. A water outlet fitment according to claim 18, wherein the fitment comprises two spaced circular formations axially secured.

* * * * *